United States Patent
Werntges et al.

(10) Patent No.: US 12,391,006 B2
(45) Date of Patent: Aug. 19, 2025

(54) SYSTEMS AND METHODS FOR JOINING THERMOPLASTIC COMPONENTS

(71) Applicant: The Boeing Company, Chicago, IL (US)

(72) Inventors: Paul G. Werntges, Charleston, SC (US); Gregory J. Hickman, University City, MO (US); Samuel J. Knutson, Charleston, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/054,610

(22) Filed: Nov. 11, 2022

(65) Prior Publication Data

US 2024/0157655 A1    May 16, 2024

(51) Int. Cl.
*B29C 65/20* (2006.01)
*B29C 65/00* (2006.01)
*B29C 65/78* (2006.01)

(52) U.S. Cl.
CPC .......... *B29C 65/20* (2013.01); *B29C 65/7841* (2013.01); *B29C 66/73921* (2013.01); *B29C 66/91231* (2013.01); *B29C 66/91421* (2013.01); *B29C 66/9221* (2013.01)

(58) Field of Classification Search
None
See application file for complete search history.

(56) References Cited

U.S. PATENT DOCUMENTS

| | | | |
|---|---|---|---|
| 4,356,052 A | 10/1982 | Moraw et al. | |
| 5,066,536 A | 11/1991 | Cogswell et al. | |
| 5,643,390 A | 7/1997 | Don et al. | |
| 7,328,734 B2 | 2/2008 | Bacik et al. | |
| 7,794,558 B2 | 9/2010 | Tsukada et al. | |
| 8,603,279 B2 | 12/2013 | Melasse et al. | |
| 9,090,022 B1 | 7/2015 | Van't Schip | |
| 9,096,015 B2 | 8/2015 | Carbonell | |
| 9,193,433 B2 | 11/2015 | Hugon et al. | |
| 2002/0088541 A1 | 7/2002 | Nishikawa et al. | |

(Continued)

FOREIGN PATENT DOCUMENTS

| CN | 108177349 | 6/2018 |
|---|---|---|
| DE | 10 2007062755 | 7/2009 |

(Continued)

OTHER PUBLICATIONS

Ginger Gardiner—"Welding thermoplastic composites," CompositesWorld (Sep. 2018). https://sc.edu/about/centers_institutes/mcnair/documents/composites_world_september.pdf.

(Continued)

*Primary Examiner* — Michael N Orlando
*Assistant Examiner* — Abhishek A Patwardhan
(74) *Attorney, Agent, or Firm* — Walters & Wasylyna LLC (57) ABSTRACT

A system for joining a first thermoplastic component of a workpiece with a second thermoplastic component of the workpiece includes a first joining plate assembly comprising a housing, a heat plate, and a thermal insulator disposed between the housing and the heat plate, wherein the heat plate defines a heating surface; a second joining plate assembly opposed from the first joining plate assembly; and a clamping assembly engaged with both the first joining plate assembly and the second joining plate assembly.

20 Claims, 9 Drawing Sheets

(56) References Cited

U.S. PATENT DOCUMENTS

| | | | |
|---|---|---|---|
| 2004/0231790 A1 | 11/2004 | Hou et al. | |
| 2011/0006460 A1* | 1/2011 | Vander Wel | B30B 15/34 |
| | | | 264/403 |
| 2013/0020022 A1 | 1/2013 | Keite-Telgenbuscher et al. | |
| 2015/0013894 A1* | 1/2015 | Matsen | B23K 20/12 |
| | | | 156/272.4 |
| 2015/0129118 A1* | 5/2015 | Hickman | B29C 70/46 |
| | | | 156/221 |
| 2015/0298388 A1 | 10/2015 | Wong et al. | |
| 2017/0157824 A1* | 6/2017 | Ward | B29C 45/0433 |
| 2020/0122216 A1* | 4/2020 | Sanders | B21D 37/16 |
| 2020/0317319 A1 | 10/2020 | Jorn et al. | |
| 2021/0016521 A1 | 1/2021 | Ferriell et al. | |
| 2021/0308956 A1 | 10/2021 | Beier et al. | |
| 2021/0339442 A1* | 11/2021 | Kmoch | B29C 45/1744 |
| 2021/0394415 A1* | 12/2021 | Nogueira | B29C 49/06 |

FOREIGN PATENT DOCUMENTS

| | | |
|---|---|---|
| DE | 10 2009014249 | 9/2010 |
| DE | 10 2019106446 | 9/2020 |
| EP | 2 505 339 | 12/2016 |
| WO | WO 2007/102085 | 9/2007 |

OTHER PUBLICATIONS

European Patent Office, Extended European Search Report, App. No. 23196789.4 (Mar. 13, 2024).

European Patent Office, "Communication pursuant to Article 94(3) EPC," App. No. 23 196 789.4 (Jun. 24, 2025).

* cited by examiner

SYSTEMS AND METHODS FOR JOINING THERMOPLASTIC COMPONENTS

FIELD

This application relates to joining of thermoplastic components and, more particularly, to systems and methods for joining thermoplastic components using thermal conduction.

BACKGROUND

Composite materials are used in various applications. For example, fiber-reinforced plastic composites have relatively high strength-to-weight ratios and, therefore, are commonly used in the aerospace, as well as other industries, such as the automotive industry.

Traditionally, thermoset fiber-reinforced plastic composites, such as carbon fiber-reinforced epoxy-based composites, were used in the aerospace industry. However, in recent years, there has been a growing interest in using thermoplastic resins in fiber-reinforced plastic composites.

The inert nature of thermoplastic materials, meaning the nonreactive nature of the thermoplastic polymer within composite material, makes joining thermoplastic materials very difficult. Therefore, thermoplastic materials are typically joined together with mechanical fasteners, which requires the additional steps of drilling the thermoplastic materials and inserting mechanical fasteners, thereby potentially generating foreign object debris (FOD) during drilling and increasing overall weight due to the presence of the mechanical fasteners.

Accordingly, those skilled in the art continue with research and development efforts in the field of joining thermoplastic materials.

SUMMARY

Disclosed are systems for joining a first thermoplastic component of a workpiece with a second thermoplastic component of the workpiece.

In one example, the disclosed system for joining a first thermoplastic component of a workpiece with a second thermoplastic component of the workpiece includes a first joining plate assembly comprising a housing, a heat plate, and a thermal insulator disposed between the housing and the heat plate, wherein the heat plate defines a heating surface; a second joining plate assembly opposed from the first joining plate assembly; and a clamping assembly engaged with both the first joining plate assembly and the second joining plate assembly.

In another example, the disclosed system for joining a first thermoplastic component of a workpiece with a second thermoplastic component of the workpiece includes a first joining plate assembly comprising a housing, a heat plate, a thermal insulator disposed between the housing and the heat plate, wherein the heat plate defines a heating surface, and a release film received over at least a portion of the heating surface of the heat plate; a second joining plate assembly opposed from the first joining plate assembly, the second joining plate assembly comprising a second housing, a second heat plate, a second thermal insulator disposed between the second housing and the second heat plate, wherein the second heat plate defines a second heating surface, and a second release film received over at least a portion of the second heating surface of the second heat plate; and a clamping assembly engaged with both the first joining plate assembly and the second joining plate assembly, the clamping assembly applies a clamping force that urges the first joining plate assembly toward the second joining plate assembly.

Also disclosed are methods for joining a first thermoplastic component of a workpiece with a second thermoplastic component of the workpiece.

In one example, the disclosed method for joining a first thermoplastic component of a workpiece with a second thermoplastic component of the workpiece includes (1) clamping the workpiece between a first joining plate assembly and a second joining plate assembly; and (2) transferring heat from at least one of the first joining plate assembly and the second joining plate assembly to the workpiece to establish a joint between the first thermoplastic component and the second thermoplastic component.

Other examples of the disclosed systems and methods for joining a first thermoplastic component of a workpiece with a second thermoplastic component of the workpiece will become apparent from the following detailed description, the accompanying drawings, and the appended claims.

DETAILED DESCRIPTION

Disclosed are systems and methods for joining a first thermoplastic component of a workpiece with a second thermoplastic component of the workpiece. The disclosed systems and methods may facilitate joining thermoplastic components in a cleaner manner and without adding weight, as compared to the drilling and fastening techniques traditionally used for joining thermoplastic components. Therefore, the disclosed systems and methods may yield joined thermoplastic components at reduced cost and improved cycle time.

Figure 1:
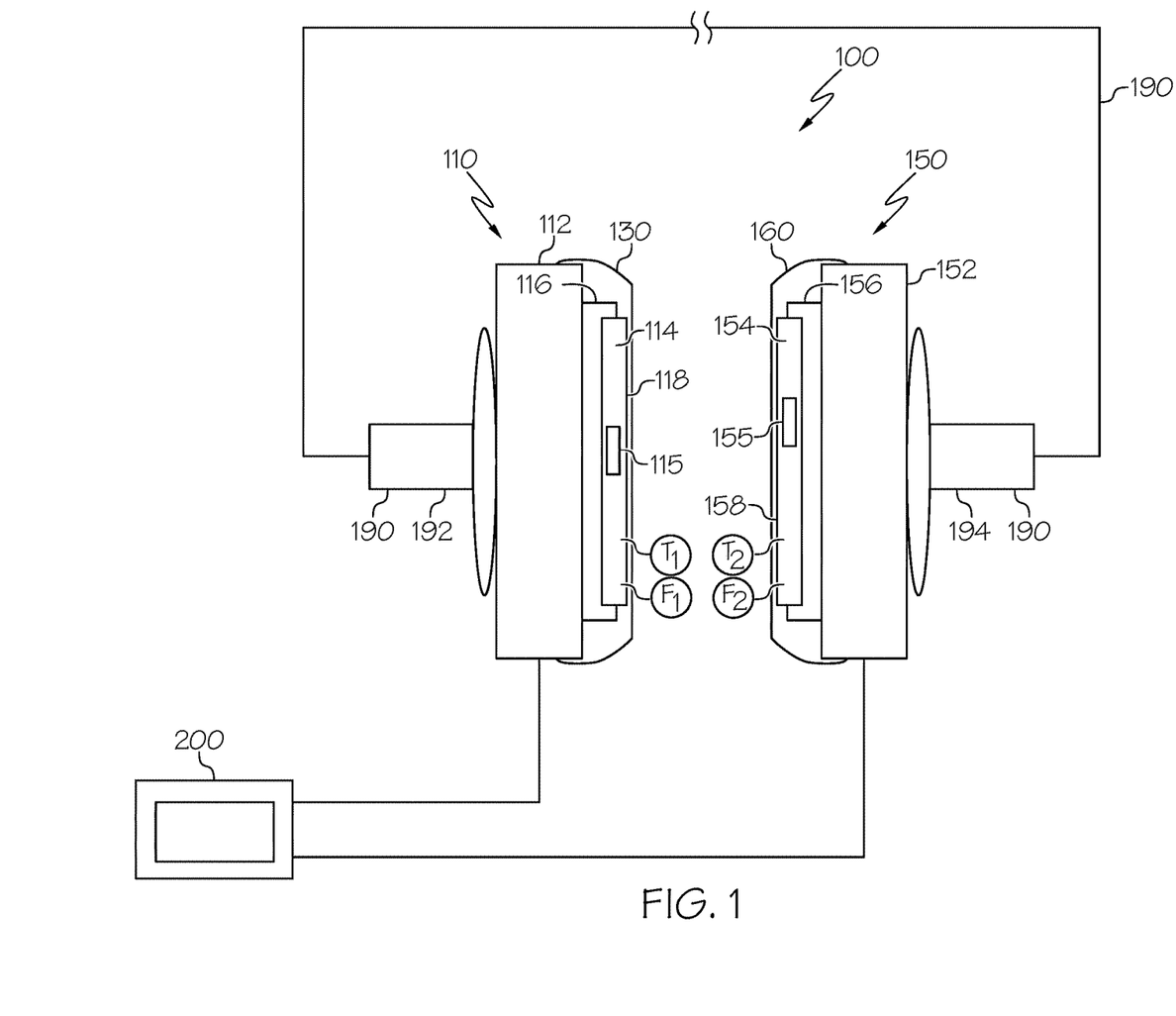
FIG. 1 is a schematic side view, partially in section, of one example of the disclosed system for joining a first thermoplastic component of a workpiece with a second thermoplastic component of the workpiece.

Referring to FIG. 1, in one example, the disclosed system 100 for joining thermoplastic components includes first joining plate assembly 110, a second joining plate assembly 150 opposed from the first joining plate assembly 110, and a clamping assembly 190 engaged with both the first joining plate assembly 110 and the second joining plate assembly 150.

Figure 2:
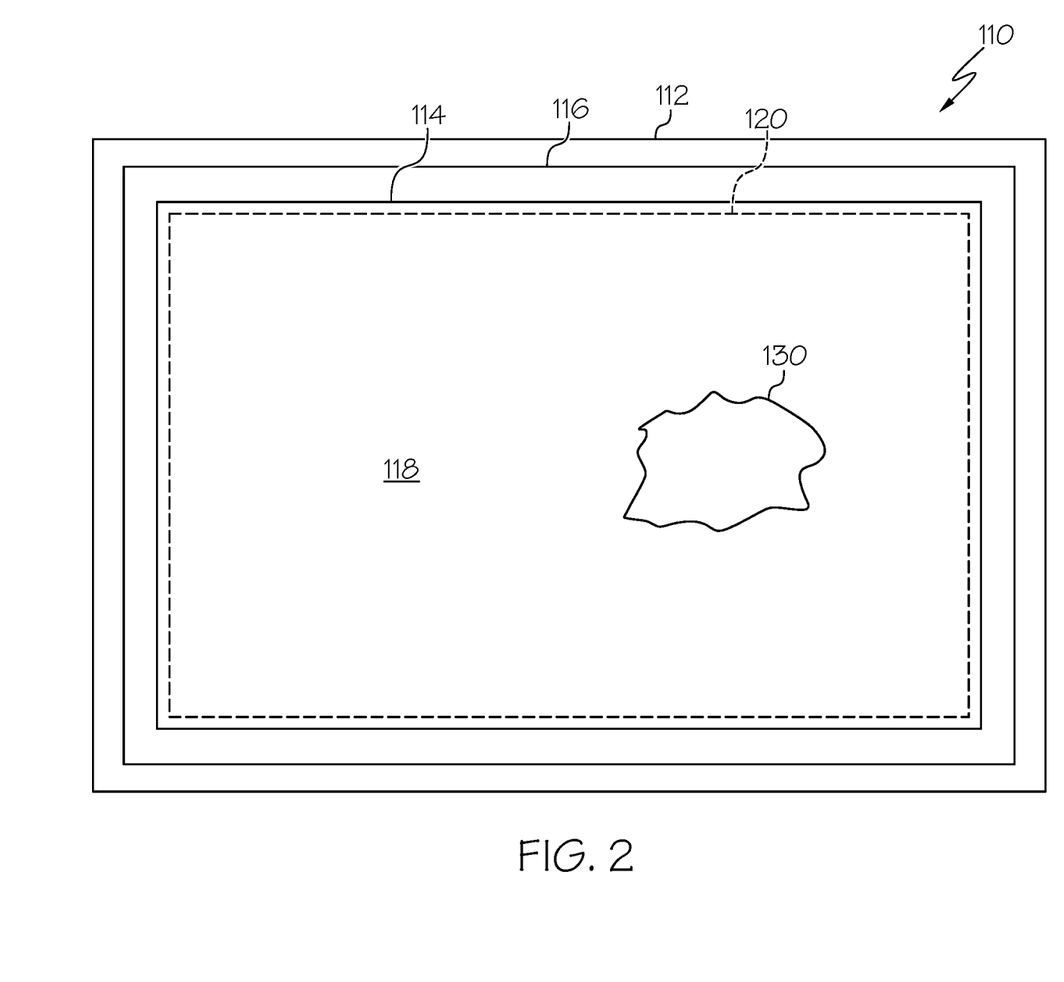
FIG. 2 is a front elevational view of the first joining plate assembly of the system shown in FIG. 1.

As shown in FIGS. 1 and 2, the first joining plate assembly 110 of the disclosed system 100 may include a housing 112, a heat plate 114, and a thermal insulator 116 disposed between the housing 112 and the heat plate 114. The housing 112 may provide backing and structural support to the first joining plate assembly 110. The thermal insulator 116 may be at least partially connected to the housing 112, and may thermally insulate the housing 112 from the heat generated by the heat plate 114. For example, but without limitation, the thermal insulator 116 may be formed from, or may include, a ceramic material, which may thermally insulate the housing 112 from the heat generated by the heat plate 114.

The heat plate 114 may be at least partially connected to the thermal insulator 116, and may generate heat. In one particular example construction, the heat plate 114 may include one or more resistive heating elements 115, which generate heat in response to the flow of electrical current. The amount of heat generated by the heat plate 114 may vary and may be controlled, such as by a controller 200 (FIG. 1), which may be in communication (e.g., wired or wireless) with the first joining plate assembly 110, and which may regulate the flow of electric current to the resistive heating elements 115.

The heat plate 114 defines a heating surface 118 that is heated by the heat generated by the heat plate 114. In one expression, the heat plate 114 is capable of heating the heating surface 118 to a temperature of at least 200° C. In another expression, the heat plate 114 is capable of heating the heating surface 118 to a temperature of at least 250° C. In another expression, the heat plate 114 is capable of heating the heating surface 118 to a temperature of at least 300° C. In another expression, the heat plate 114 is capable of heating the heating surface 118 to a temperature of at least 350° C. In another expression, the heat plate 114 is capable of heating the heating surface 118 to a temperature of at least 400° C. In yet another expression, the heat plate 114 is capable of heating the heating surface 118 to a temperature between about 250° C. and about 350° C.

The first joining plate assembly 110 may also include a temperature sensor $T_1$. The temperature sensor $T_1$ may be positioned to sense the temperature of the heating surface 118 of the heat plate 114. For example, the temperature sensor $T_1$ may be a thermocouple or the like, and may be incorporated into the first joining plate assembly 110, such as into the heat plate 114. The temperature sensor $T_1$ may be in communication (e.g., wired or wireless) with the controller 200 to facilitate control of the temperature of the heating surface 118 of the heat plate 114.

In one particular implementation, the system 100 is configured as a relatively small, hand-held device. As a handheld device, the system 100 may be easily portable (such as by an individual technician). Therefore, the heating surface 118 of the heat plate 114 may have a surface area 120 that is relatively small. In one example, the surface area 120 of the heating surface 118 of the heat plate 114 is at most 1 ft². In another example, the surface area 120 of the heating surface 118 of the heat plate 114 is at most 0.5 ft². In yet another example, the surface area 120 of the heating surface 118 of the heat plate 114 is at most 0.25 ft².

In one particular construction, the heat plate 114 may be relatively flexible and conformable for engaging a contoured surface of a workpiece 10. Therefore, when the heating surface 118 of the heat plate 114 is engaged with a surface 13 (FIG. 3) of a workpiece 10 (FIG. 3) that is contoured, the heat plate 114 conforms to the surface 13.

The first joining plate assembly 110 may also include a release film 130. The release film 130 may be received over at least a portion of (if not all of) the heating surface 118 of the heat plate 114. Compositionally, the release film 130 may be selected for use with thermoplastic composites, such as carbon fiber-reinforced thermoplastic composites. As one specific, non-limiting example, the release film 130 may be a polyimide film and/or may include a polyimide.

Referring to FIG. 1, the second joining plate assembly 150 may have a configuration that is substantially the same as the first joining plate assembly 110. Specifically, the second joining plate assembly 150 of the disclosed system 100 may include a housing 152, a heat plate 154, and a thermal insulator 156 disposed between the housing 152 and the heat plate 154. The housing 152 may provide backing and structural support to the second joining plate assembly 150. The thermal insulator 156 may be at least partially connected to the housing 152, and may thermally insulate the housing 152 from the heat generated by the heat plate 154. For example, but without limitation, the thermal insulator 156 may be formed from, or may include, a ceramic material, which may thermally insulate the housing 152 from the heat generated by the heat plate 154.

The heat plate 154 may be at least partially connected to the thermal insulator 156, and may generate heat. In one particular example construction, the heat plate 154 may include one or more resistive heating elements 155, which generate heat in response to the flow of electrical current. The amount of heat generated by the heat plate 154 may vary and may be controlled, such as by a controller 200, which may be in communication (e.g., wired or wireless) with the second joining plate assembly 150, and which may regulate the flow of electric current to the resistive heating elements 155. The heat plate 154 of the second joining plate assembly 150 may be controllable by the controller 200 independently of the heat plate 114 of the first joining plate assembly 110.

The heat plate 154 defines a heating surface 158 that is heated by the heat generated by the heat plate 154. In one expression, the heat plate 154 is capable of heating the heating surface 158 to a temperature of at least 200° C. In another expression, the heat plate 154 is capable of heating the heating surface 158 to a temperature of at least 250° C. In another expression, the heat plate 154 is capable of heating the heating surface 158 to a temperature of at least 300° C. In another expression, the heat plate 154 is capable of heating the heating surface 158 to a temperature of at least 350° C. In another expression, the heat plate 154 is capable of heating the heating surface 158 to a temperature of at least 400° C. In yet another expression, the heat plate 154 is capable of heating the heating surface 158 to a temperature between about 250° C. and about 350° C.

The second joining plate assembly 150 may also include a temperature sensor $T_2$. The temperature sensor $T_2$ may be positioned to sense the temperature of the heating surface 158 of the heat plate 154. For example, the temperature sensor $T_2$ may be a thermocouple or the like, and may be incorporated into the second joining plate assembly 150, such as into the heat plate 154. The temperature sensor $T_2$ may be in communication (e.g., wired or wireless) with the controller 200, which controls of the temperature of the heating surface 158 of the heat plate 154.

As previously mentioned, the system 100 may be configured as a relatively small, hand-held device. Therefore, the heating surface 158 of the heat plate 154 may have a surface area 159 that is relatively small. In one example, the surface area 159 of the heating surface 158 of the heat plate 154 is at most 1 ft$^2$. In another example, the surface area 159 of the heating surface 158 of the heat plate 154 is at most 0.5 ft$^2$. In yet another example, the surface area 159 of the heating surface 158 of the heat plate 154 is at most 0.25 ft$^2$. In one particular configuration, the heating surface 158 of the heat plate 154 of the second joining plate assembly 150 has a surface area 159 that is substantially equal to the surface area 120 of the heating surface 118 of the heat plate 114 of the first joining plate assembly 110.

In one particular construction, the heat plate 154 of the second joining plate assembly 150 may be relatively flexible and conformable. Therefore, when the heating surface 158 of the heat plate 154 is engaged with a surface 15 (FIG. 3) of a workpiece 10 (FIG. 3) that is contoured, the heat plate 154 conforms to the surface 15.

The second joining plate assembly 150 may also include a release film 160. The release film 160 may be received over at least a portion of (if not all of) the heating surface 158 of the heat plate 154. Compositionally, the release film 160 may be selected for use with thermoplastic composites, such as carbon fiber-reinforced thermoplastic composites. As one specific, non-limiting example, the release film 160 may be a polyimide film and/or may include a polyimide.

While the second joining plate assembly 150 is shown and described having a configuration that is substantially the same as the configuration of the first joining plate assembly 110, various alternative configurations are contemplated and the use of alternative configurations for the second joining plate assembly 150 (as compared to the first joining plate assembly 110) will not result in a departure from the scope of the present disclosure. For example, in one example alternative configuration, the second joining plate assembly 150 may be without heat plate and thermal insulator.

Figure 4:
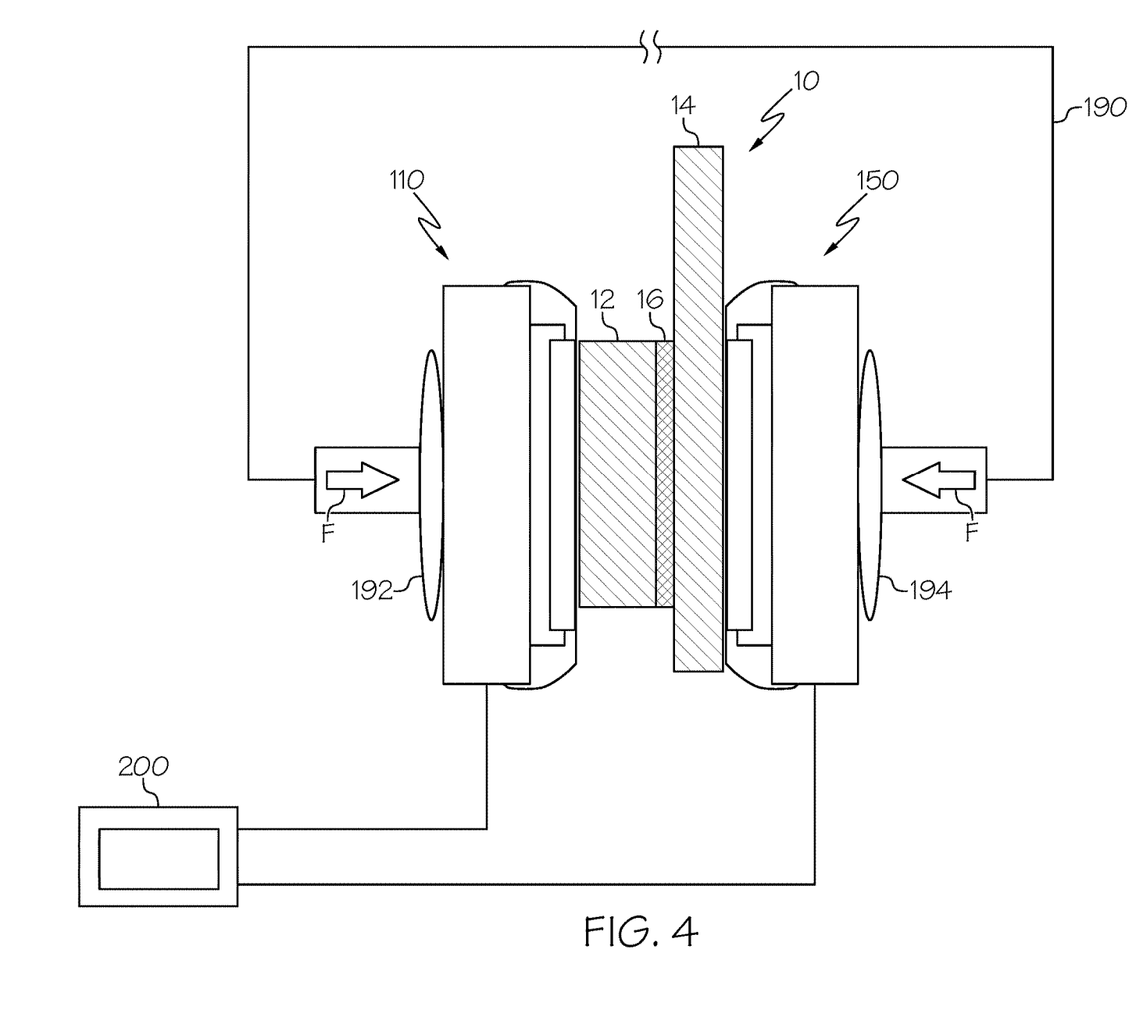
FIG. 4 is a schematic side view, partially in section, of the workpiece shown in FIG. 3 being clamped by the system shown in FIG. 1.

Referring to FIGS. 1 and 4, the clamping assembly 190 of the disclosed system 100 is engaged with both the first joining plate assembly 110 and the second joining plate assembly 150. For example, the clamping assembly 190 includes a first clamp member 192 and a second clamp member 194. The first clamp member of the clamping assembly 190 may be engaged with the first joining plate assembly 110 and the second clamp member 194 of the clamping assembly 190 may be engaged with the second joining plate assembly 150.

The clamping assembly 190 may apply a clamping force F that urges the first joining plate assembly 110 toward the second joining plate assembly 150. Therefore, as shown in FIG. 4, when a workpiece 10 is positioned between the first joining plate assembly 110 and the second joining plate assembly 150, the clamping force F is transferred to the workpiece 10 by the first joining plate assembly 110 and the second joining plate assembly 150.

The clamping assembly 190 may be any apparatus or system capable of clamping a workpiece 10 (FIG. 3) between the first joining plate assembly 110 and the second joining plate assembly 150 such that a clamping force F is applied to the workpiece 10. As one specific, non-limiting example, the clamping assembly 190 may be (or may include) a C-clamp. As another specific, non-limiting example, the clamping assembly 190 may be (or may include) a vise.

Figure 3:
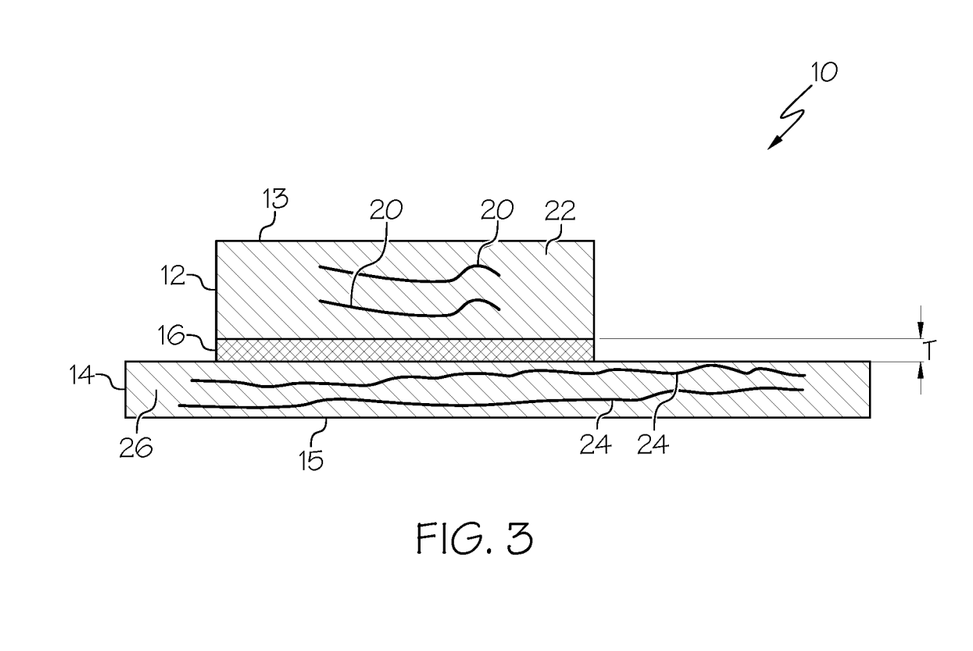
FIG. 3 is a side cross-sectional view of a workpiece that can be joined using the system of FIG. 1.

Optionally, as shown in FIG. 1, the first joining plate assembly 110 may include a force sensor $F_1$ and/or the second joining plate assembly 150 may include a force sensor $F_2$. The force sensors $F_1$, $F_2$ may be positioned to sense the clamping force F (FIG. 4) being applied by the first joining plate assembly 110 and the second joining plate assembly 150 to the workpiece 10 (FIGS. 3 and 4). For example, the force sensors $F_1$, $F_2$ may be strain gauges or the like, and may be incorporated into the first joining plate assembly 110 and the second joining plate assembly 150. The force sensors $F_1$, $F_2$ may optionally be in communication (e.g., wired or wireless) with the controller 200 or other feature (e.g., a warning on the first joining plate assembly 110 or on the clamping assembly 190) to provide a visual, audible and/or haptic indication when the applied clamping force F has exceeded a predefined threshold value and/or if the applied clamping force F is not evenly (or otherwise properly) applied.

Figure 5:
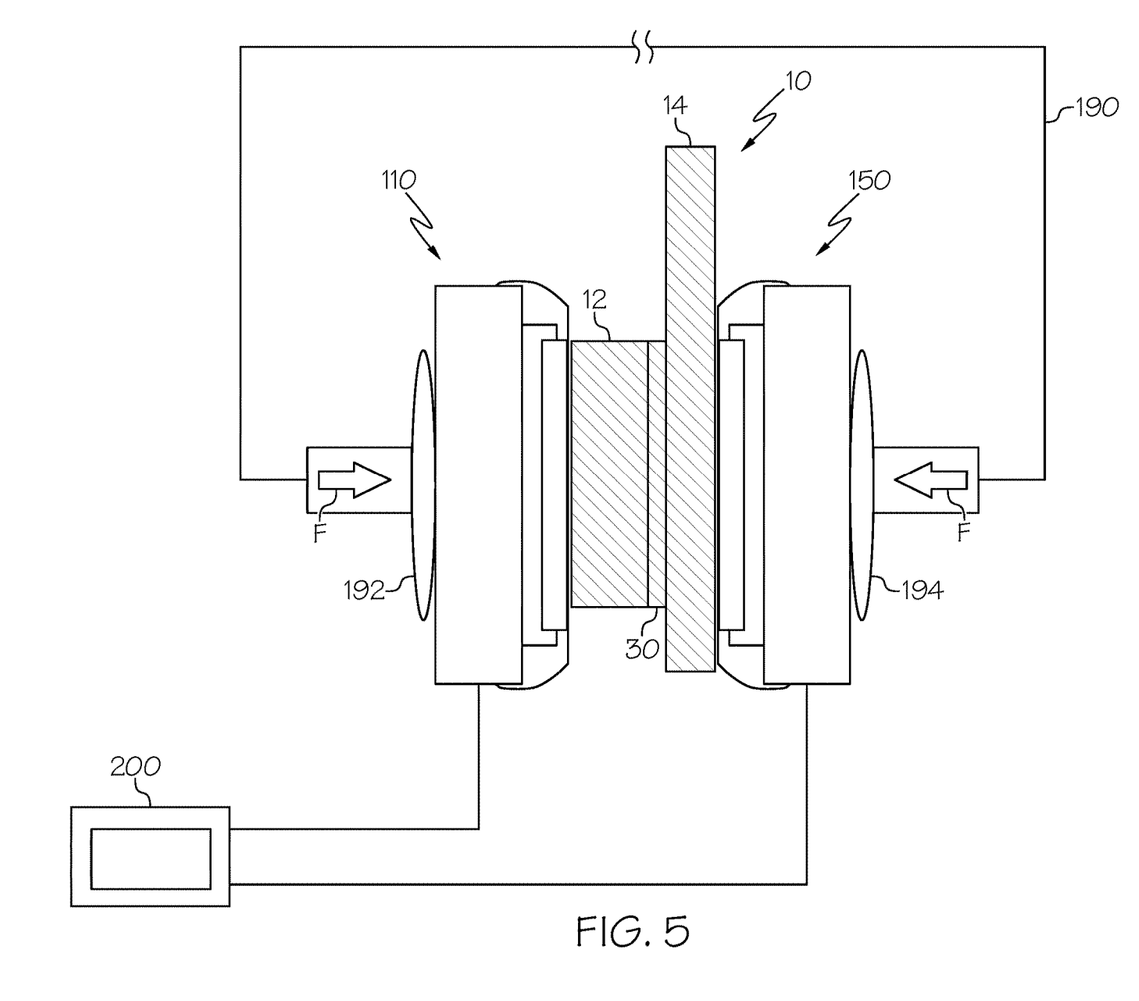
FIG. 5 is a schematic side view, partially in section, of the workpiece of FIG. 3 received in the system of FIG. 1, shown after a joint has been formed in the workpiece.
Figure 10:
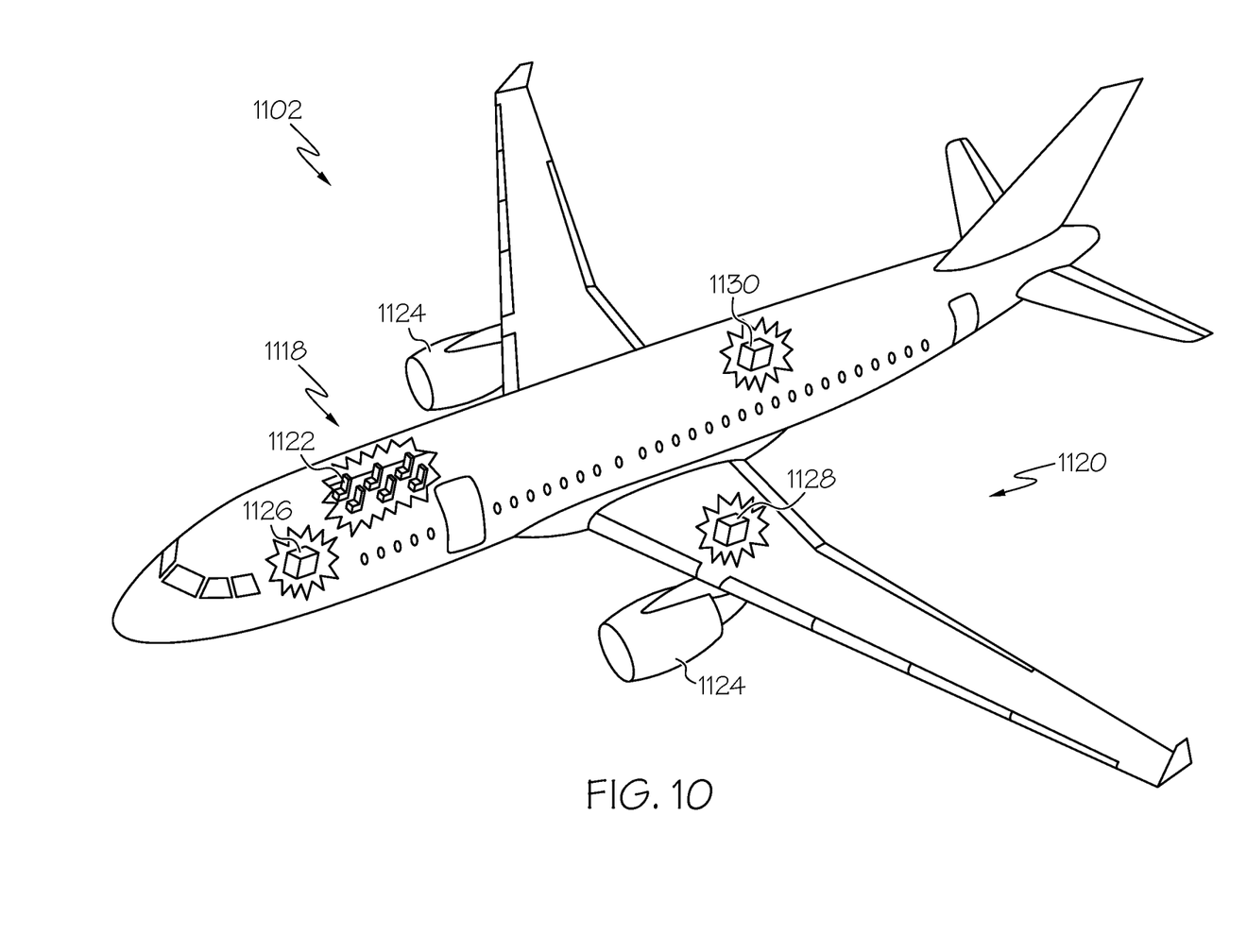
FIG. 10 is a schematic illustration of an aircraft.

Referring to FIGS. 3-5, the disclosed system 100 may be used to form a joint 30 (FIG. 5) between a first thermoplastic component 12 and a second thermoplastic component 14 of a workpiece 10. Both the first thermoplastic component 12 of the workpiece 10 and the second thermoplastic component 14 of the workpiece 10 may be components of an aircraft 1102 (FIG. 10). However, non-aerospace applications are also contemplated.

The first thermoplastic component 12 may include a first reinforcement material 20 (e.g., carbon fiber) embedded in a first thermoplastic matrix material 22 (e.g., a member of the polyaryletherketone (PAEK) family of thermoplastic materials). The second thermoplastic component 14 may include a second reinforcement material 24 (e.g., carbon fiber) embedded in a second thermoplastic matrix material 26 (e.g., a member of the polyaryletherketone (PAEK) family of thermoplastic materials). In one example, the first thermoplastic matrix material 22 may be substantially compositionally identical to the second thermoplastic matrix material 26. In another example, the first thermoplastic matrix material 22 may be substantially compositionally different from the second thermoplastic matrix material 26.

As shown in FIGS. 3 and 4, in one particular implementation, a thermoplastic film 16 may be positioned between the first thermoplastic component 12 and the second thermoplastic component 14 of the workpiece 10. Compositionally, the thermoplastic film 16 may be, for example, a member of the polyaryletherketone (PAEK) family of thermoplastic materials. Structurally, the thermoplastic film 16 may have, for example, a cross-sectional thickness T of about 0.0005 inch to about 0.01 inch. Significantly, the thermoplastic film 16 may have a lower melting temperature than the first thermoplastic component 12 of the workpiece 10 and a lower melting temperature than the second thermoplastic component 14 of the workpiece 10 (i.e., both the first melting temperature and the second melting temperature are greater than the third melting temperature).

Figure 6:
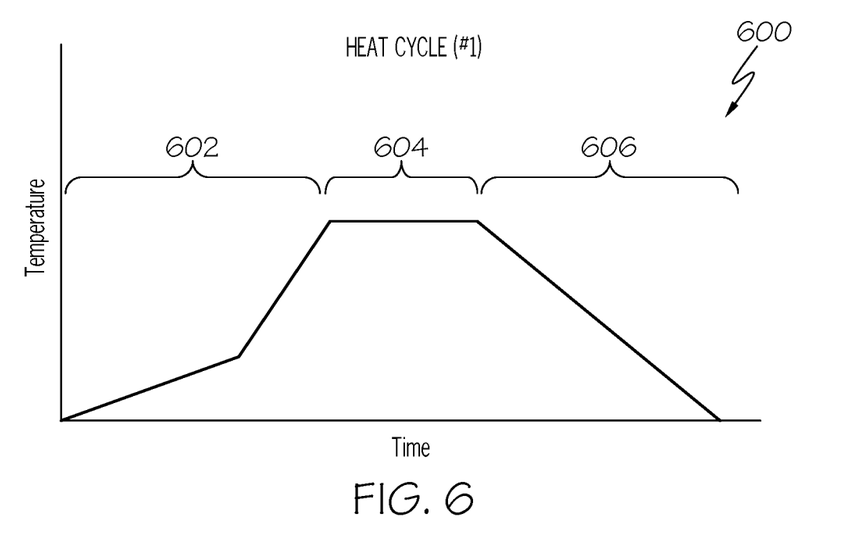
FIG. 6 is a graphical depiction of an example predefined heat cycle undergone by one heat plate of the system of FIG. 1.
Figure 7:
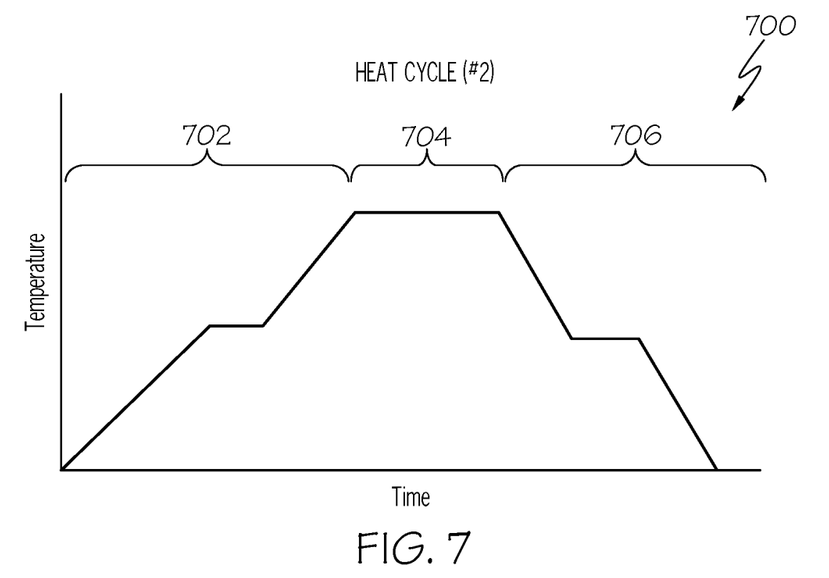
FIG. 7 is a graphical depiction of an example predefined heat cycle undergone by another, opposed heat plate of the system of FIG. 1.

Referring to FIGS. 1 and 3-7, the controller 200 of the disclosed system 100 may control the heat plate 114 of the first joining plate assembly 110 and the heat plate 154 of the second joining plate assembly 150 based on sensed temperature signals received from the temperature sensors $T_1$, $T_2$ to heat the heating surface 118 of the heat plate 114 according to a first predefined heat cycle 600 (FIG. 6) and the heating surface 158 of the heat plate 154 according to a second predefined heat cycle 700 (FIG. 7). The applied heat may transfer into the workpiece 10 by thermal conduction and may melt at least a portion of the workpiece 10 (e.g., the thermoplastic film 16) to form a joint 30 (FIG. 5) between the first thermoplastic component 12 and the second thermoplastic component 14 of the workpiece 10.

The first predefined heat cycle 600 and the second predefined heat cycle 700 may be customized for a particular workpiece 10 (FIG. 3). The first predefined heat cycle 600 may include a temperature ramp-up period 602, a steady/hold period 604, and a cool-down period 606. Likewise, the second predefined heat cycle 700 may include a temperature ramp-up period 702, a steady/hold period 704, and a cool-down period 706. In one implementation, the first predefined heat cycle 600 and/or the second predefined heat cycle 700 may be generated by modeling. In another implementation, the first predefined heat cycle 600 and/or the second predefined heat cycle 700 may be generated by testing (e.g., trial and error).

Thus, upon execution of the first predefined heat cycle 600 and the second predefined heat cycle 700, a joint 30 may be formed between the first thermoplastic component 12 and the second thermoplastic component 14 of the workpiece 10.

Figure 8:
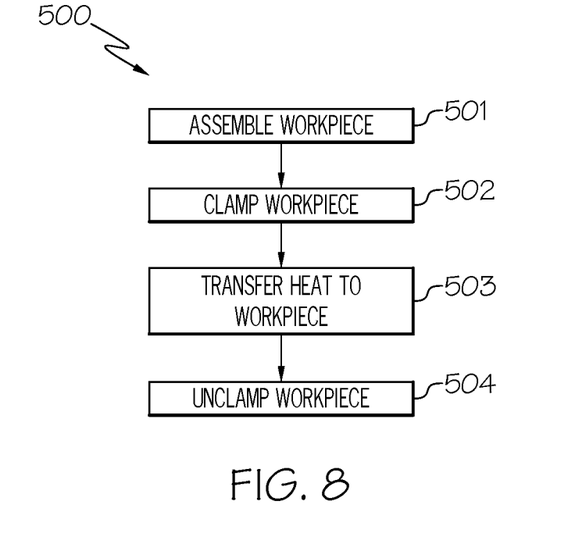
FIG. 8 is a block diagram depicting one example of the disclosed method for joining a first thermoplastic component of a workpiece with a second thermoplastic component of the workpiece.

Referring now to FIG. 8, also disclosed is a method 500 for joining thermoplastic components. In one example, the disclosed method 500 may begin with the step of assembling 501 a workpiece 10, as shown in FIG. 3. The step of assembling 501 the workpiece 10 may be performed prior to other steps, such as prior to the clamping 502 the workpiece 10.

As shown in FIG. 3, the step of assembling 501 a workpiece 10 may include positioning a first thermoplastic component 12 against a second thermoplastic component 14. Both the first thermoplastic component 12 of the workpiece 10 and the second thermoplastic component 14 of the workpiece 10 may be components of an aircraft 1102 (FIG. 10). However, non-aerospace applications are also contemplated.

The first thermoplastic component 12 may include a first reinforcement material 20 (e.g., carbon fiber) embedded in a first thermoplastic matrix material 22 (e.g., a member of the polyaryletherketone (PAEK) family of thermoplastic materials). The second thermoplastic component 14 may include a second reinforcement material 24 (e.g., carbon fiber) embedded in a second thermoplastic matrix material 26 (e.g., a member of the polyaryletherketone (PAEK) family of thermoplastic materials). In one example, the first thermoplastic matrix material 22 may be substantially compositionally identical to the second thermoplastic matrix material 26. In another example, the first thermoplastic matrix material 22 may be substantially compositionally different from the second thermoplastic matrix material 26.

In one particular implementation, the step of assembling 501 a workpiece 10 may further include positioning a thermoplastic film 16 between the first thermoplastic component 12 and the second thermoplastic component 14. Compositionally, the thermoplastic film 16 may be, for example, a member of the polyaryletherketone (PAEK) family of thermoplastic materials. Structurally, the thermoplastic film 16 may have, for example, a cross-sectional thickness T of about 0.0005 inch to about 0.01 inch. Significantly, the thermoplastic film 16 may have a lower melting temperature than the first thermoplastic component 12 of the workpiece 10 and a lower melting temperature than the second thermoplastic component 14 of the workpiece 10.

Referring back to FIG. 8, the disclosed method 500 further includes the step of clamping 502 the workpiece 10 between a first joining plate assembly 110 (FIG. 1) and a second joining plate assembly 150 (FIG. 1). The step of clamping 502 may be performed after the step of assembling 501.

The first joining plate assembly 110 (FIG. 1) may be configured as shown and described herein. Likewise, the second joining plate assembly 150 (FIG. 1) may be configured as shown and described herein.

As shown in FIG. 4, the clamping 502 may be performed by a clamping assembly 190. For example, the clamping assembly 190 may include a first clamp member 192 and a second clamp member 194. The first clamp member of the clamping assembly 190 may be engaged with the first joining plate assembly 110 and the second clamp member 194 of the clamping assembly 190 may be engaged with the second joining plate assembly 150.

The clamping assembly 190 may apply a clamping force F that urges the first joining plate assembly 110 toward the second joining plate assembly 150. Therefore, when a workpiece 10 is positioned between the first joining plate assembly 110 and the second joining plate assembly 150, the clamping force F is transferred to the workpiece 10 by the first joining plate assembly 110 and the second joining plate assembly 150.

The clamping assembly 190 may be any apparatus or system capable of clamping a workpiece 10 (FIG. 3) between the first joining plate assembly 110 and the second joining plate assembly 150 such that a clamping force F is applied to the workpiece 10. As one specific, non-limiting example, the clamping assembly 190 may be (or may include) a C-clamp. As another specific, non-limiting example, the clamping assembly 190 may be (or may include) a vise.

Referring to FIGS. 5 and 8, the disclosed method 500 further includes the step of transferring 503 heat from at least one of the first joining plate assembly 110 and the second joining plate assembly 150 to the workpiece 10 to establish a joint 30 between the first thermoplastic component 12 and the second thermoplastic component 14 of workpiece 10. The step of transferring 503 heat may be performed after the step of clamping 502 or simultaneously with the step of clamping 502.

At this point, those skilled in the art will appreciate that the step of transferring 503 heat from at least one of the first joining plate assembly 110 and the second joining plate assembly 150 to the workpiece 10 may include heating (e.g., resistively heating) the heat plate 114 of the first joining plate assembly 110 and the heat plate 154 of the second joining plate assembly 150 and executing the first predefined heat cycle 600 and the second predefined heat cycle 700 shown in FIGS. 6 and 7. At this point, those skilled in the art will also appreciate that the transferring 503 of heat from at least one of the first joining plate assembly 110 and the second joining plate assembly 150 to the workpiece 10 (e.g., to the thermoplastic film 16 within the workpiece 10) is primarily effected by thermal conduction.

Referring to FIG. 8, the disclosed method 500 may further include the step of unclamping 504 the workpiece 10 from the first joining plate assembly 110 (FIG. 1) and the second joining plate assembly 150 (FIG. 1). The step of unclamping 504 may be performed after completion of the step of transferring 503 heat. For example, the step of unclamping 504 may be performed after the first joining plate assembly 110 completes the first predefined heat cycle 600 (FIG. 6) and the second joining plate assembly 150 completes the second predefined heat cycle 700 (FIG. 7).

Figure 9:
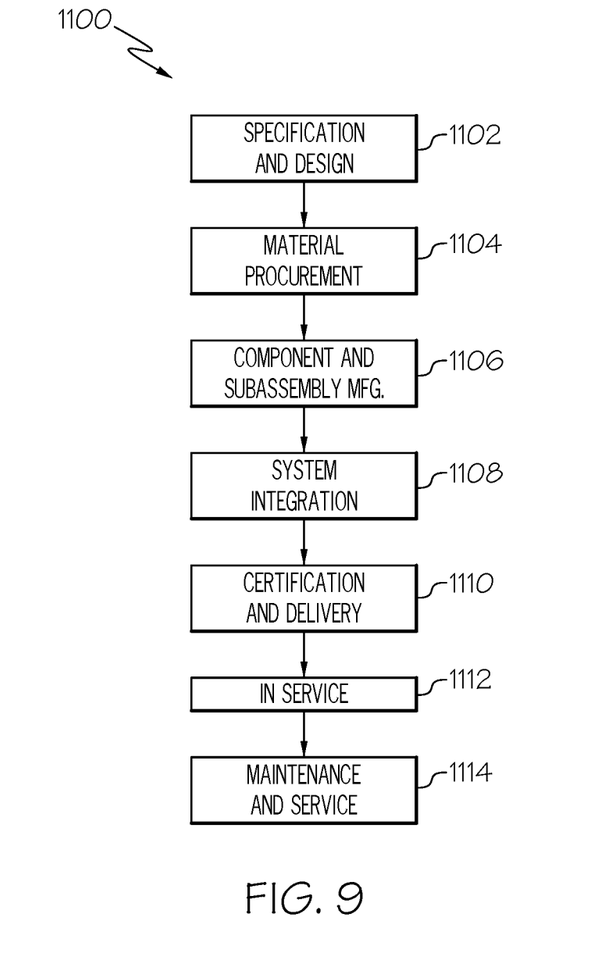
FIG. 9 is a block diagram of aircraft production and service methodology.

Examples of the subject matter disclosed herein may be described in the context of aircraft manufacturing and service method 1100 as shown in FIG. 9 and aircraft 1102 as shown in FIG. 10. In one or more examples, the disclosed systems and methods for joining a first thermoplastic component of a workpiece with a second thermoplastic component of the workpiece may be used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

The disclosed systems and methods for joining a first thermoplastic component of a workpiece with a second thermoplastic component of the workpiece may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Although various examples of the disclosed systems and methods for joining a first thermoplastic component of a workpiece with a second thermoplastic component of the workpiece have been shown and described, modifications may occur to those skilled in the art upon reading the specification. The present application includes such modifications and is limited only by the scope of the claims.

What is claimed is:

1. A system for joining a first thermoplastic component of a workpiece with a second thermoplastic component of the workpiece, the system comprising:
   a first joining plate assembly comprising a housing, a heat plate, a thermal insulator disposed between the housing and the heat plate and a release film directly on the heat plate, wherein the heat plate defines a heating surface;
   a second joining plate assembly opposed from the heating surface of the first joining plate assembly; and
   a clamping assembly engaged with both the housing of the first joining plate assembly and the second joining plate assembly;
   wherein the clamping assembly is configured to apply a clamping force that urges the second joining plate assembly toward the first joining plate assembly such that, when the workpiece is between the first joining plate assembly and the second joining plate assembly, the clamping force is transferred by the first joining plate assembly to the first thermoplastic component of the workpiece and by the second joining plate assembly to the second thermoplastic component of the workpiece.

2. The system of claim 1 wherein the heat plate is capable of heating the heating surface to a temperature of at least 300° C.

3. The system of claim 1 wherein the heating surface of the heat plate has a surface area of at most 1 ft$^2$.

4. The system of claim 1 wherein the heat plate is at least partially connected to the thermal insulator.

5. The system of claim 1 wherein the thermal insulator comprises a ceramic material.

6. The system of claim 1 wherein the clamping assembly comprises at least one sensor positioned to sense the clamping force.

7. The system of claim 1 further comprising a controller in communication with at least one of the first joining plate assembly and the second joining plate assembly.

8. The system of claim 7 wherein the first joining plate assembly comprises a temperature sensor positioned to sense a temperature of the heating surface of the heat plate, the temperature sensor being in communication with the controller.

9. The system of claim 7 wherein the controller controls the heat plate to heat the heating surface according to a predefined heat cycle wherein the heating surface is configured to transfer the heat into the workpiece by thermal conjunction to join the first thermoplastic component and the second thermoplastic component, when the workpiece is between the first joining plate assembly and the second joining plate assembly, in conjunction with the clamping force being transferred to the workpiece by the first joining plate assembly and the second joining plate assembly.

10. The system of claim 1 configured as a hand-held device.

11. A system for joining a first thermoplastic component of a workpiece with a second thermoplastic component of the workpiece, the system comprising:
   a first joining plate assembly comprising a housing, a heat plate, a thermal insulator disposed between the housing and the heat plate, wherein the heat plate defines a heating surface, and a release film directly on at least a portion of the heating surface of the heat plate;
   a second joining plate assembly opposed from the heating surface of the first joining plate assembly, the second joining plate assembly comprising a second housing, a second heat plate, a second thermal insulator disposed between the second housing and the second heat plate, wherein the second heat plate defines a second heating surface, and a second release film received over at least a portion of the second heating surface of the second heat plate; and
   a clamping assembly engaged with both the housing of the first joining plate assembly and the second housing of the second joining plate assembly, the clamping assembly configured to apply a clamping force that urges the first joining plate assembly toward the second joining plate assembly such that, when the workpiece is between the first joining plate assembly and the second joining plate assembly, the clamping force is transferred by the first joining plate assembly to the first thermoplastic component of the workpiece and by the second joining plate assembly to the second thermoplastic component of the workpiece.

12. A system for joining a first thermoplastic component of a workpiece with a second thermoplastic component of the workpiece, the system comprising:
   a first joining plate assembly having a workpiece engagement surface and an opposing clamp engagement surface, the first joining plate assembly including:
      a housing;
      a heat plate having a heating surface;
      a thermal insulator disposed between the housing and the heat plate; and
      a release film disposed directly on the heating surface of the heat plate, the release film defining the workpiece engagement surface;
   a second joining plate assembly having a workpiece engagement surface and an opposing clamp engagement surface; and
   a clamping assembly engaged with the clamp engagement surfaces of the first and second joining plate assemblies.

13. The system of claim 12, wherein the heating surface is substantially flat.

14. The system of claim 12, wherein the heat plate comprises a resistive heating element.

15. The system of claim 12, wherein the housing comprises a clamp engagement surface, and wherein the clamping assembly engages with a portion of the clamp engagement surface.

16. The system of claim 15, wherein the clamp engagement surface is substantially flat.

17. The system of claim 15 wherein the first joining plate assembly comprises a temperature sensor positioned to sense a temperature of the heating surface of the heat plate.

18. The system of claim 12 further comprising a force sensor positioned to sense a clamping force applied by the clamping assembly.

19. The system of claim 12 further comprising a controller in communication with the first joining plate assembly.

20. The system of claim 1 wherein the heating surface of the heat plate is flexible and conformable.

* * * * *